United States Patent [19]

Lehman

[11] 4,276,159
[45] Jun. 30, 1981

[54] APPARATUS FOR SCREENING PAPER FIBER STOCK

[75] Inventor: Donald F. Lehman, Middletown, Ohio

[73] Assignee: The Black Clawson Company, Middletown, Ohio

[21] Appl. No.: 161,100

[22] Filed: Jun. 19, 1980

[51] Int. Cl.³ .............................................. B07B 1/20
[52] U.S. Cl. .................................... 209/273; 209/306; 209/397; 210/415
[58] Field of Search ............... 209/273, 305, 306, 397, 209/270; 210/415

[56] References Cited

U.S. PATENT DOCUMENTS

| | | | |
|---|---|---|---|
| 2,301,514 | 11/1942 | Brewster | 209/397 |
| 3,581,903 | 6/1971 | Holz | 210/415 |
| 3,617,008 | 11/1971 | Lamort | 209/393 X |
| 3,849,302 | 11/1974 | Seifert | 209/273 |
| 4,200,537 | 4/1980 | Lamort | 209/273 X |

Primary Examiner—Ralph J. Hill
Attorney, Agent, or Firm—Biebel, French & Nauman

[57] ABSTRACT

In screening apparatus for paper making fiber incorporating a cylindrical screen member provided with screening perforations which are either cylindrical or slotted in section, the perforations are characterized by greater flow area on the inlet side of the cylinder than on the accepts side of the cylinder. More specifically, each of the screening perforations includes a generally funnel-shaped portion on the inlet side of the cylinder which leads to a short parallel sided portion on the accepts side of the cylinder.

6 Claims, 6 Drawing Figures

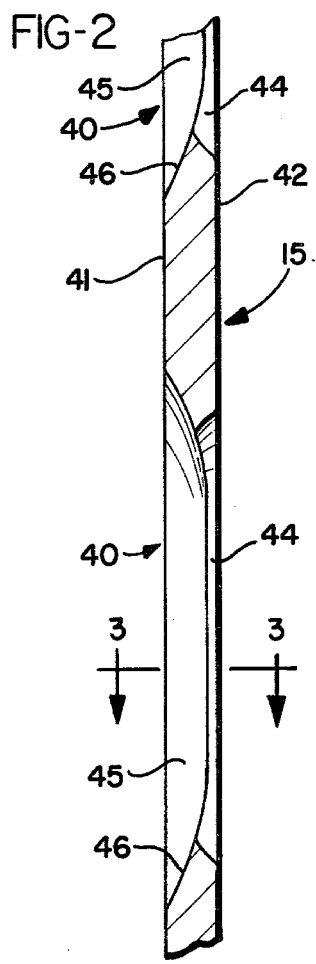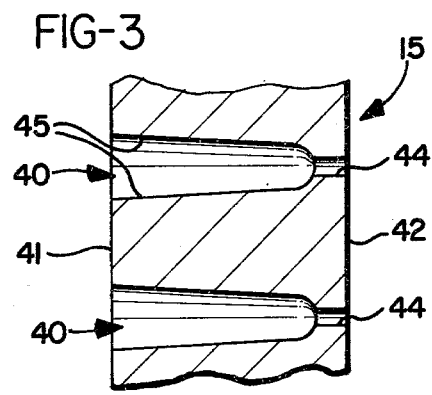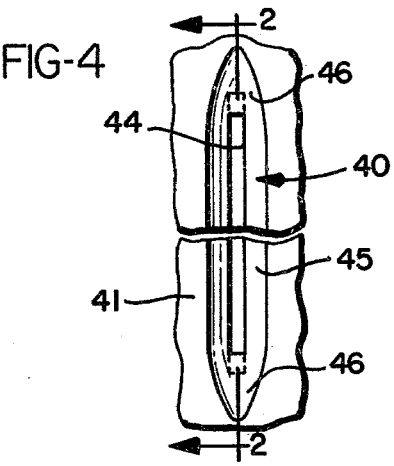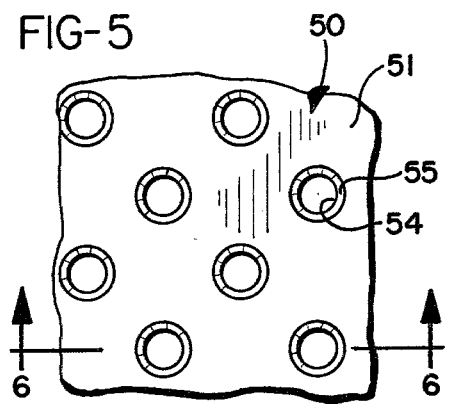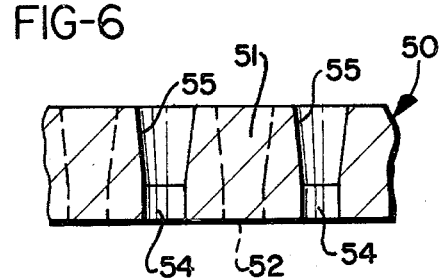

APPARATUS FOR SCREENING PAPER FIBER STOCK

BACKGROUND OF THE INVENTION

Paper mills have for many years made extensive use, for the cleaning of paper making stock, of screening apparatus embodying a cylindrical perforated screening member defining inlet and accepts chambers on the opposite sides thereof in a closed housing and including a rotor member which operates in one of the chambers to keep the screening perforations open and free from solid material tending to cling to the screening surface. Commonly, the stock or furnish is delivered to the inlet chamber adjacent one end of the screening cylinder, and the material rejected by the screening cylinder is collected and discharged from its opposite end.

The assignee of this invention has manufactured and sold many such screens in accordance with a series of U.S. patents, commencing with Staege U.S. Pat. No. 2,347,716, and followed by Martindale U.S. Pat. No. 2,835,173; Seifert U.S. Pat. Nos. 3,849,302 and 4,105,543 and Chupka, Seifert U.S. Pat. No. 4,155,841. Starting with the construction shown in the Martindale patent, all such screens manufactured and sold by applicant's assignee have been characterized by a rotor comprising bars or vanes of airfoil section moving in closely spaced but non-contacting relation with the surface of the screening cylinder for the purpose of creating alternating positive and negative pressure waves effective on the perforations in the screening cylinder to prevent plugging thereof.

The art has experimented widely with detailed variations in screens of the above type, including variations in the vane shape and other forms of rotor, and also in the size, configuration, and spacing of the perforations in the screening cylinder. Thus in the era of the Staege patent in the mid-1940's, the screening cylinder was fabricated from plate material with multiple uniformly cylindrical drilled perforations. When this drilled plate was rolled into a cylinder, a natural result of the rolling operation was to effect some constriction and expansion, respectively, of the inner and outer ends of the drilled holes which were on the inlet (inside) and accepts (outside) surfaces of the resulting screening cylinder. This led in due course to the practice of relieving the accepts end of each cylindrical perforation by a conical bore or countersunk portion to minimize the possibility of plugging.

In more recent years, the trade has been offered pressure screens generally of the above type wherein the perforations in the screening cylinder are elongated slots rather than round holes, typical such constructions being shown in Lamort U.S. Pat. No. 3,617,008; Holz U.S. Pat. No. 3,581,903, and the above noted Seifert '302 and Chupka-Seifert patents. Both Lamort and Holz show slotted screening cylinders wherein the slots have parallel sided portions on the inlet side of the cylinder, but on the accepts side, each slot has widely diverging side walls. Similarly in Chupka-Seifert, the screening cylinder is fabricated from wire of triangular section with the base of the triangle on the inlet side of the cylinder.

This practice of providing relief on the accepts side of the perforations in the screening cylinder of a pressure screen has thus been followed consistently in the paper industry since it was first introduced. The art has demonstrated a conviction that this practice is necessary to minimize the possibility that the perforations would be plugged by fiber and/or contaminant particles unless their minimum dimension is at their inlet ends. Indeed, this conviction has been so firm that all of the claims of the Holz patent include limitations to a "boat-shaped" configuration of the screening slots on the accepts side of the screening cylinder.

SUMMARY OF THE INVENTION

In accordance with the present invention, it has been discovered that the prior art was wrong in its conviction that the screening perforations in the screening cylinder of a pressure screen needed to be relieved on the accepts side of the cylinder. More importantly, it was discovered that not only will such screens operate without plugging when the screening perforations are not relieved on the inlet side of the cylinder, but most unexpectedly, significantly improved results are obtainable when the perforations are relieved on the inlet side of the cylinder, e.g., in the same manner and to the same extent as has commonly been done on the accepts side of the cylinder.

These facts and advantages, and their relation to the art of screening paper making stock will be explained in more detail in the description of the preferred embodiments of the invention which follows.

BRIEF DESCRIPTION OF THE DRAWINGS

FIG. 2 is an enlarged fragmentary section through the screening cylinder in the screen of FIG. 1, taken as indicated by the line 2—2 in FIG. 4;

FIG. 3 is a section on the line 3—3 of FIG. 2;

FIG. 4 is a fragmentary view of the inlet side of the screening cylinder of FIG. 2-3;

FIG. 5 is a fragmentary view of the inlet side of a screening cylinder equipped with cylindrical screening perforations in accordance with the invention; and FIG. 6 is a fragmentary section on the lines 6—6 of FIG. 5.

DESCRIPTION OF THE PREFERRED EMBODIMENTS

Figure 1:
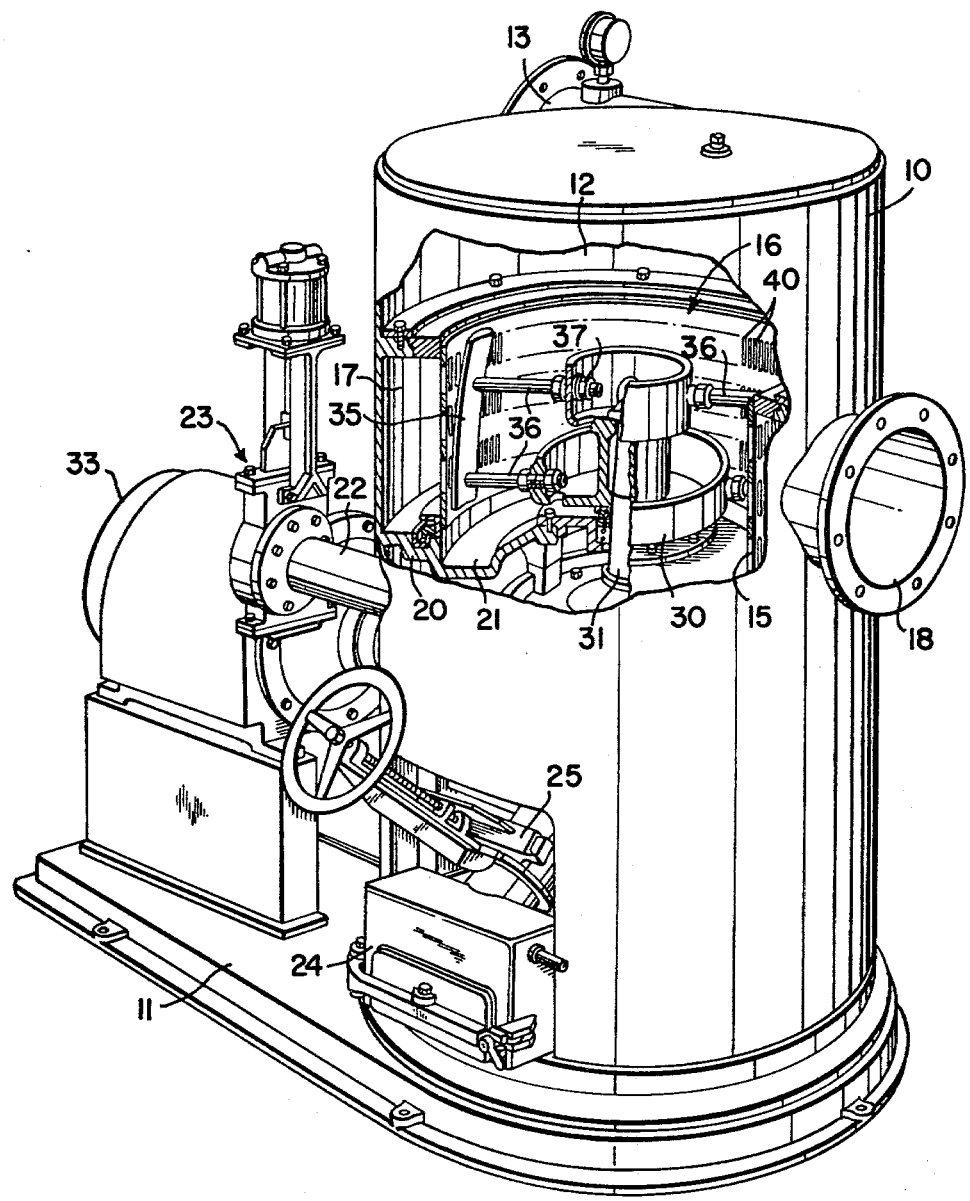
FIG. 1 is a perspective view, partly broken away, of pressure screening apparatus embodying the invention.

The screening apparatus shown in FIG. 1 is constructed generally in accordance with Seifert U.S. Pat. No. 3,849,302, with certain exceptions in accordance with the invention. It comprises a main housing 10 on a base 11, and in the upper end of the housing is an inlet chamber 12 having a tangential inlet port 13 to which the furnish is supplied under pressure as is customary with such screening apparatus. A cylindrical screening member 15 divides the interior of the housing below chamber 12 into a central supply chamber 16 and an accepts chamber 17 having an outlet port 18.

The bottom wall 20 of the supply chamber 16 includes a trough 21 leading to a discharge port 22 provided with a control valve assembly 23 which can be preset to provide a desired continual bleed of reject-rich stock. Heavy particles which settle into the trough 21 drop therefrom to the heavy trash collection box 24 by way of manually controlled valve 25 for intermittent removal.

A rotor 30 is supported on a drive shaft 31 in the center of the supply chamber 16 and is driven through suitable gearing or belts by a motor 33 also mounted on the base 11. Vanes or bars 35, are mounted on the rotor 30 by support rods 36, and adjustable connections 37 between the inner ends of rods 36 and rotor 30 provide for positioning the vanes 35 in properly spaced relation with the inner surface of screening member 15, in accordance with standard practices.

The vanes 35 extend the full length of the screening surface of screen member 15, and they are helically curved and so arranged that the upper end of each vane is spaced forwardly of the lower end in the direction of rotation of the rotor, shown as clockwise. Two vanes 35 are shown, but other numbers can be used, and in general a greater number, e.g., four, may make possible improved operation at higher consistencies.

The screening member 15 is provided with multiple screening slots 40 extending substantially parallel with its axis and the axis of rotor 30. These slots are shown as arranged in circumferential rows, with the rows spaced apart axially of member 15, but these specific arrangements are not critical. The significant feature is the configuration of the individual slots with respect to the inlet side 41 and accepts side 42 of the screening cylinder 15, as shown in enlarged detail in FIGS. 2–4.

Thus each slot 40 has a portion defined by straight parallel walls 44 which extends from the accepts side 42 of the member 15 a short distance into the interior of the wall of member 15, e.g., approximately 0.040 inch when the wall of member 15 is 0.312 inch thick. The remainder of the slot is defined by side walls 45 and end walls 46 which converge from the inlet side 41 of member 15 to meet the parallel walls 44.

In fabricating the screening cylinder 15, the converging portion of each slot is preferably cut by means of a milling cutter of appropriate dimensions to cut the inlet portions of the slot with a trough shape which is substantially wider than the maximum width of the parallel sided portion of the slot, and which has a tip portion of semispherical shape and a radius substantially greater than one-half the maximum width of the parallel sided portion of the slot, e.g., a radius of 0.027 inch as compared with a maximum slot width of 0.035 inch. The accepts side of each slot is readily cut by a circular saw blade, which imparts a curved configuration to the end walls 47 of the slot, but these walls are so short with relation to the straight walls 44 as to be negligible, a typical length for the trough slot portion being 2.63 inches.

As already noted, the side walls 45 converge to meet the parallel walls 44, and satisfactory results have been obtained with each of the walls 45 extending at an angle of 3° to a normal to the wall of member 15, thereby providing a total divergence of 6° for the opposed walls 45 from their closest spacing of 0.005 inch. In commercial practice, the parallel-walled slot portions are used in a range of widths from approximately 0.008 to 0.035 inch, so that the difference between the widths of opposite ends of each slot 40 will lie in a range of approximately 0.020 to 0.047 inch, or a range of ratios of width differences from 1.57 to 6.88.

In a series of comparative tests, a screen of the invention equipped with a screening cylinder approximately 24 inches in diameter and having slots 0.018 inch wide was compared with a screen constructed as shown in Seifert U.S. Pat. No. 3,849,302 and having the standard slot configuration of the same width, i.e., a slot configured precisely as shown in FIGS. 2–3 except that the parallel-walled portion was on the inlet side of the cylinder. Thus in both screens, the difference in width between the small and large ends of the slots was 0.037 inch or a ratio of 3.05.

In one set of tests, the stock was a mixture of virgin pulps, 30% bleached hard wood and 70% bleached soft wood, at a consistency of 1.7% solids. The screen equipped with a conventionally slotted screen cylinder produced an accepts output of 50 tons per day at a pressure drop of 5.5 pounds, 65 tons per day at a pressure drop of 8.3 pounds, and 85 tons per day at a pressure drop of 11 pounds. The power consumption for the 85 tons per day output was 32.2 horsepower, the accepts flow rate was 900 gallons and the reject flow rate was 12.7% of the supply flow.

In contrast, and operating with the same stock and at the same rotor speed of 663 rpm, the screen of the invention produced an output of 50 tons per day at a pressure drop of only 1 pound, and 87 tons per day at a pressure drop of 2 pounds and reject flow rate of 14%. At the most closely comparable outputs of 85 and 87 tons per day respectively, the screen of the invention drew 40.2 horsepower as compared with 32.2 horsepower for the conventional screen, but the screen of the invention was clearly operating far below its capacity, and by increasing its reject rate to 40%, the accepts output was increased to 1750 gpm and 171 tons per day at a pressure drop of only 5 pounds while drawing the same horsepower, which represents a reduction of approximately one-third in the power requirements per day per ton.

In another set of tests, the stock was bleached soft wood kraft with a freeness in excess of 700 and therefore very hard to screen in conventional screens without plugging, and the tests included runs with different stock consistencies. The conventional screen produced an output of 50 tons per day at a consistency of 1% and a pressure drop of 18 pounds, and it was able to produce 80 tons per day of 2% stock at a pressure drop of 18.5 pounds, but with the consistency increased to 2.8%, it could handle only 17 tons per day and then only with its reject rate increased to 68%.

In contrast, the screen of the invention, operating at the same rotor speed of 793 rpm, produced an output of 92 tons per day of 0.9% stock at a pressure drop of only 6 pounds and could clearly have operated at substantially higher capacity except at that point, the test system exceeded the capacity of the available supply pump. The screen of the invention also produced an output of 145 tons per day of 1.7% stock at the same pressure drop of 6 pounds, at which point the capacity of the available supply pump was again exceeded.

Thus in both of the first two runs, the output of the screen of the invention would have been substantially higher if greater supply pump pressure had been available. Further, the screen of the invention produced an output of 225 tons per day of 2.7% stock at a pressure drop of 12 pounds, a reject rate of only 15%, and power consumption of 67.1 horsepower as compared with 61.7 horsepower which the conventional screen required for an output of only 17 tons per day of essentially the same consistency stock, thereby clearly demonstrating the much greater capacity of the screen of the invention and hence its much lower horsepower per ton per day requirements.

Thus instead of plugging under the test conditions, as the art would have expected and predicted, the screen of the invention actually proved capable of far better performance than screens of conventional construction, and it was the commercial screen which plugged while attempting to screen the same test stocks which the screen of the invention handled successfully and at substantially lower horsepower requirements.

It should be understood that the invention does not necessarily require that the slots 40 have parallel-walled portions 44, and that the slots can be produced entirely with a milling cutter so that all of their walls converge from the surface 41 to the surface 42, provided that the shape and dimensions of the cutter establish the desired maximum and minimum dimensions for the opposite ends of the slots. The illustrated design, however, does have the advantage of relatively easily establishing the desired minimum and maximum slot dimensions.

The invention is also not limited to slotted screening members, and FIGS. 5 and 6 illustrate in detail a fragment of a screening cylinder 50 provided with screening holes of circular section and arranged in accordance with the invention so that surface 51 is on the inlet side and surface 52 on the accepts side of the screening cylinder. Each of the screening holes includes a cylinder portion 54 extending inwardly from the accepts side 51, and a frustoconical portion 55 countersunk from the surface 52 to meet the cylindrical portion 54.

As an example of suitable dimension diagrams for use in a screening member 50 3 1/16 inch thick, the cylindrical portion 54 may be approximately 0.062 inch long, and the frusto-conical portion may have an included angle of 14° and therefore will be 0.031 inch greater in diameter at its inlet end than the cylindrical portion 54. Thus if the cylindrical portion 54 is 0.079 inch in diameter, which is a typical dimension for screens of this type, the frusto-conical portion 55 will have a diameter of 0.110 inch at its inlet end. The same angular dimension for the countersunk portion of the hole is usable with cylindrical portions 54 of other standard dimensions, e.g., 0.062 and 0.094 inch, and as in the case of slotted screen members as discussed above, the circular screening holes can be frostoconical throughout their lengths instead of having cylindrical portions 44.

The drawings illustrate the invention only as applied to screens wherein the inlet chamber is on the inside of the screening cylinder. For use in screen wherein it is the accepts chamber which is inside the screening cylinder, such as the above Holz patent, the configurations of the holes or slots would be reversed to locate their smallest dimension on the outside of the cylinder.

While the forms of apparatus herein described constitute preferred embodiments of the invention, it is to be understood that the invention is not limited to these precise forms of apparatus, and that changes may be made therein without departing from the scope of the invention.

What is claimed is:

1. Screening apparatus for paper making stock comprising, a pressure housing, a cylindrical screening member dividing the interior of said housing into an inlet chamber and an accepts chamber and having multiple screening perforations therethrough, and a rotor mounted for rotation in said housing and including vane means for preventing plugging of said perforations, and further characterized by the fact that said perforations are of greater flow area on the surface of said screening member facing said inlet chamber than on the accepts side of said screening member.

2. Screening apparatus as defined in claim 1 wherein each of said perforations is a passageway defined at least at part by walls which converge from the surface of said screening member facing said inlet chamber toward the surface of said screen member facing said accepts chamber.

3. Screening apparatus as defined in claim 1 wherein each of said perforations is a passageway having a parallel walled portion of uniform crosssection extending part way through said screening member from the surface thereof facing said accepts chamber, and wherein the portion of said passageway leading to said parallel-walled portion from the surface of said screening member facing said inlet chamber is defined by walls which converge from said inlet chamber surface of said screening member to said parallel-walled portion.

4. Screening apparatus as defined in claim 1 wherein said perforations are in the form of slots each comprising an essentially parallel-walled portion extending part way into said screening member from the surface thereof facing said accepts chamber, and a portion leading to said parallel-walled portion from the opposite surface of said screening member which is defined by walls converging in the direction of the flow to said parallel-walled portion of said slot.

5. Screening apparatus as defined in claim 4 wherein said slots are substantially longer than they are wide and extend generally parallel with the axis of said cylindrical screening member.

6. Screening apparatus as defined in claim 1 wherein each of said perforations is circular in cross-section and comprises a cylindrical portion facing said accepts chamber and a frusto-conical portion leading to said cylindrical portion from the surface of said screening member facing said inlet chamber.

* * * * *